(12) United States Patent
Lozano

(10) Patent No.: US 7,747,285 B2
(45) Date of Patent: Jun. 29, 2010

(54) METHOD OF TRANSMIT BEAMFORMING FOR MULTICASTING IN A WIRELESS COMMUNICATION SYSTEM

(75) Inventor: Angel Lozano, Hoboken, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 403 days.

(21) Appl. No.: 11/776,046

(22) Filed: Jul. 11, 2007

(65) Prior Publication Data

US 2009/0015472 A1 Jan. 15, 2009

(51) Int. Cl.
*H04M 1/00* (2006.01)
(52) U.S. Cl. ................. 455/562.1; 455/561; 455/575.7; 455/67.11
(58) Field of Classification Search ............. 455/562.1, 455/13.3, 63.4, 272, 273, 276.1, 107, 108, 455/575.7, 69, 561, 63.1, 63.2, 446, 450; 342/378–383, 354, 117, 154
See application file for complete search history.

(56) References Cited

U.S. PATENT DOCUMENTS

| | | | | |
|---|---|---|---|---|
| 7,542,734 | B2 * | 6/2009 | Piirainen ................ | 455/101 |
| 2003/0181165 | A1 * | 9/2003 | Sugar et al. ............. | 455/69 |
| 2004/0198228 | A1 * | 10/2004 | Raghothaman ......... | 455/63.1 |
| 2006/0019709 | A1 * | 1/2006 | Kim et al. .............. | 455/562.1 |
| 2006/0251156 | A1 * | 11/2006 | Grant et al. ............ | 375/148 |
| 2006/0285585 | A1 * | 12/2006 | Sampath ................ | 375/227 |
| 2007/0207730 | A1 * | 9/2007 | Nguyen et al. ......... | 455/39 |
| 2008/0211576 | A1 * | 9/2008 | Moffatt et al. ......... | 330/149 |
| 2008/0227397 | A1 * | 9/2008 | Prasad et al. .......... | 455/63.1 |
| 2008/0291981 | A1 * | 11/2008 | Jonsson et al. ........ | 375/148 |
| 2008/0304586 | A1 * | 12/2008 | Molnar .................. | 375/260 |

FOREIGN PATENT DOCUMENTS

WO  WO 2005/062496 A  7/2005

OTHER PUBLICATIONS

Communication relating to the results of the International Search Report from counterpart International Application No. PCT/US2008/008201 dated Dec. 1, 2008.

Lozano, Angel "Long-Term Transmit Beamforming for Wireless Multicasting" *Acoustics, Speech and Signal Processing*, ICASSP 2007 [on-line] Apr. 15-20, 2007 pp. 417-420 XP002504455 Retrieved from the Internet Nov. 17, 2008: URL:http://ieeexplore.ieee.org/xpls/abs_all.jsp?arnumber=4217735>The whole document.

(Continued)

*Primary Examiner*—Duc Nguyen
*Assistant Examiner*—Dominic E Rego
(74) *Attorney, Agent, or Firm*—Williams, Morgan & Amerson, P.C.

(57) ABSTRACT

The present invention provides a method of determining a plurality of beamforming weights for application to multicast transmission to a plurality of users by a corresponding plurality of antennas associated with a base station. One embodiment of the method includes determining a covariance matrix associated with the plurality of users. The covariance matrix is determined based on a channel matrix and a noise-plus-interference vector associated with each user. The method also includes determining the plurality of beamforming weights based on a gradient of the covariance matrix associated with a selected one of the plurality of users and storing the plurality of beamforming weights.

13 Claims, 2 Drawing Sheets

OTHER PUBLICATIONS

Sidiropoulos et al., "Transmit Beamforming for Physical-Layer Multicasting" *IEEE Transactions on Signal Processing*, vol. 54, No. 6, Jun. 6, 2006, pp. 2239-2251, XP002504456 The whole document.
Lopez, M.J., "Multiplexing, Scheduling and Multi-casting Strategies for Antenna Arrays in Wireless Networks" *PH.D. Thesis, Dept. of Elec. Eng. And Comp. Sci., 20 MIT*, [on-line] Aug. 2002, XP002504457, Cambridge, Retrieved from the Internet: URL:http//dspace.mit.edu/bitstream/handle/1721.1/5537/TR%23700.pdf?sequence=1>The whole document.

* cited by examiner

METHOD OF TRANSMIT BEAMFORMING FOR MULTICASTING IN A WIRELESS COMMUNICATION SYSTEM

BACKGROUND OF THE INVENTION

1. Field of the Invention

This invention relates generally to communication systems, and, more particularly, to wireless communication systems.

2. Description of the Related Art

Base stations in wireless communication systems provide wireless connectivity to users within a geographic area, or cell, associated with the base station. The wireless communication links between the base station and each of the users typically includes one or more downlink (or forward) channels for transmitting information from the base station to the mobile unit and one or more uplink (or reverse) channels for transmitting information from the mobile unit to the base station.

Downlink channels may be used to multicast a common radio message to several user terminals on a multicast channel. For example, users may subscribe to a multicast service that is provided by a server in a wireless communication system. The subscribers may receive the multicast information at a predetermined time or when the information becomes available. Exemplary multicast applications include the transmission of television signals, radio, audio, and/or video streaming, stock valuations, news summaries, and the like. Although multicasting information is advantageous because it permits information to be transmitted to multiple users over a single channel, the coding rate for the multicast information is typically limited by the subscriber having the lowest channel quality. For example, multicast systems are designed so that the multicast channel can be decoded by users in a large percentage of the locations served by each base station. Consequently, multicast messages transmitted by the base station must be encoded at a low rate so that even the most distant subscribers can decode the multicast transmission.

If the transmitters and/or receivers are equipped with multiple antennas, beamforming techniques can potentially be used to improve the performance of the multicasting system. For example, let $n_T$ denote the number of transmit antennas at a base station and let K indicate the number of users connected to the base station. Each user is equipped with $n_R$ receive antennas. The channel coefficients between each transmit antenna and each receive antenna at user k can be assembled into an $n_R \times n_T$ matrix $H_k$, k=1, . . . , K. The relationship between transmit and receive signals can be represented as:

$$y_k = H_k x + n_k$$

where x is an $n_T$-dimensional vector containing the transmit signals, $y_k$ is the $n_R$-dimensional vector of received signals at user k and $n_k$ is an $n_R$-dimensional noise vector with a covariance of $\Sigma_k = E[n_k n_k^+]$. The beamforming operation that generates x is defined as x=ws, where s is a multicast signal with power $P=E[|s|^2]$ and w represents the beamforming vector whose entries indicate the complex weights applied to each transmit antenna. In order to preserve the overall signal power, the beamforming weights must satisfy the requirement $\|w\|=1$. In a wide band system such as a system that uses orthogonal frequency division multiplexing, the matrices and vectors described above may be functions of frequency and therefore the above equations would describe what happens on any specific narrow subband of the wide band system.

The beamforming weights can be adjusted using information available at the transmitter. For example, statistical channel state information can be used to adjust the beamforming weights to influence the average signal-to-interference-and-noise ratios (SINR) at the receivers. The problem of determining optimal beamforming weights based on the SINR can be defined using the average SINR for the kth user:

$$\overline{SINR}_k(w) = P w^+ \Theta_k w$$

where $\Theta_k$ the covariance matrix:

$$\Theta_k = E[H_k^+ \Sigma_k^{-1} H_k]$$

where the expectation is defined over the fading within $H_k$. In the illustrated case, the channel statistics are not a function of frequency and so the beamforming weights are also independent of frequency. The optimum beamforming vector is defined by the set of beamforming weights that maximize the minimum data rate offered within the coverage area. Thus, the problem of finding the optimum beamforming vector may be expressed as:

$$w = \underset{\|w\|=1}{\arg\max} \min \overline{SINR}_k(w)$$

where the minimization is taken over all users within the appropriate coverage area. However, finding an optimal beamforming solution in a MIMO wireless communication system using the approach described above is an NP-hard problem.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for determining a plurality of beamforming weights for application to multicast transmission to a plurality of users by a corresponding plurality of antennas associated with a base station. One embodiment of the method includes determining a covariance matrix associated with the plurality of users. The covariance matrix is determined based on a channel matrix and a noise-plus-interference vector associated with each user. The method also includes determining the plurality of beamforming weights based on a gradient of the covariance matrix associated with a selected one of the plurality of users and storing the plurality of beamforming weights.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Figure 1:
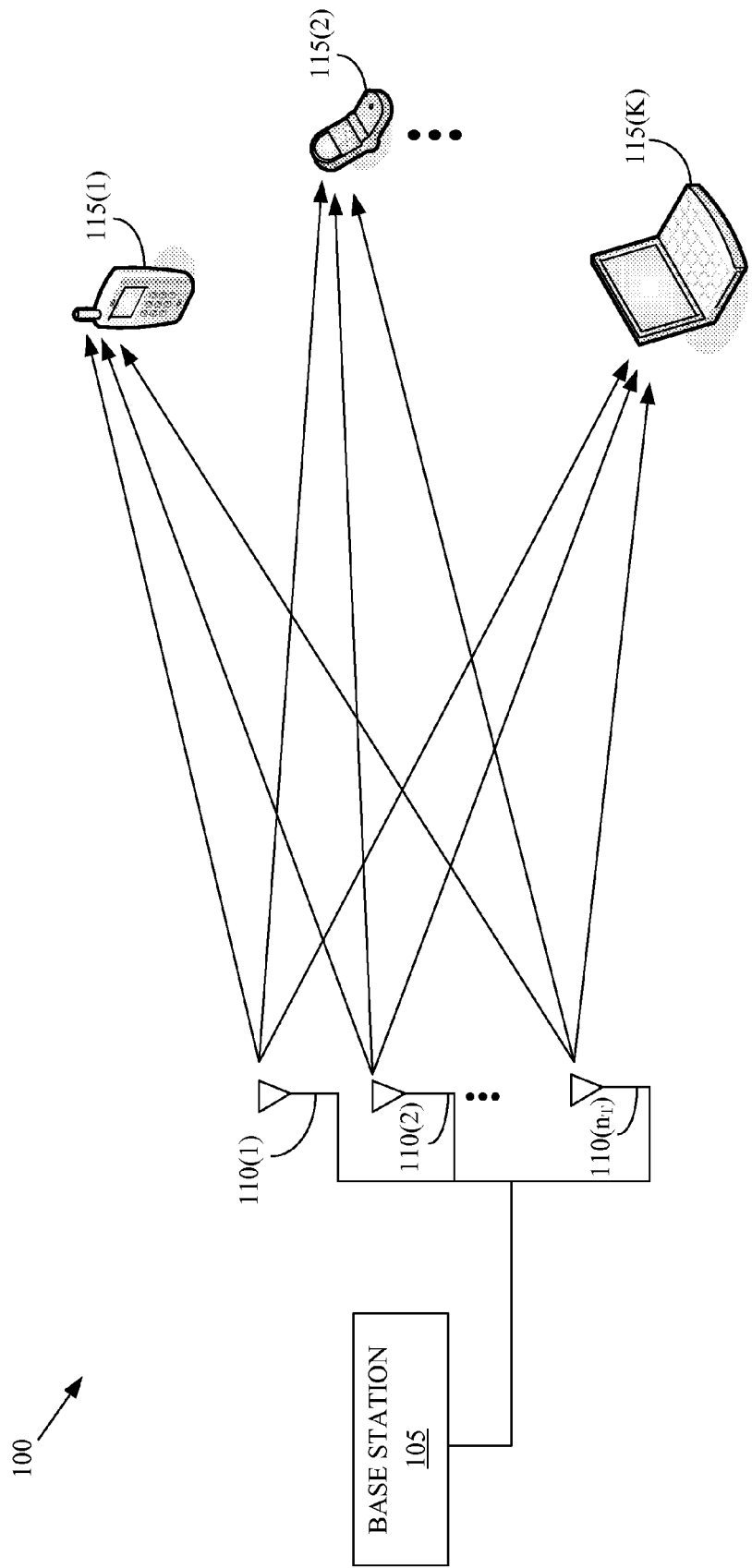
FIG. 1 conceptually illustrates one exemplary embodiment of a wireless communication system, in accordance with the present invention.

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes a base station 105 is configured to provide wireless connectivity using a plurality of antennas 110(1–$n_T$). The indices (1–$n_T$) may be used to indicate individual antennas 110 or subset thereof. However, these indices may be dropped when referring to the antennas 110 collectively. This convention may be applied to other elements shown in the drawings and indicated by a numeral and one or more distinguishing indices. In one embodiment, the base station 105 is able to transmit the same information concurrently using one or more of the antennas 110.

One or more mobile units 115 may access the wireless communication system 100 over air interfaces with the base station 105. For example, the mobile units 115 may establish wireless communication links to the base station 105 via the antennas 110. The wireless communication links include one or more uplink and/or downlink channels for transmitting and/or receiving information. For example, if each mobile unit 115 is equipped with $n_R$ receive antennas, the channel coefficients between each transmit antenna 110 and each receive antenna at user k can be represented by an $n_R \times n_T$ matrix $H_k$, k=1, ..., K. The relationship between transmit and receive signals can be represented as:

$$y_k = H_k x + n_k$$

where x is an $n_T$-dimensional vector containing the transmit signals, $y_k$ is the $n_R$-dimensional vector of received signals at the kth user and $n_k$ is an $n_R$-dimensional noise vector with a covariance of $\Sigma_k = E[n_k n_k^+]$. The beamforming operation that generates x is defined as x=ws, where s is a multicast signal with power $P = E[|s|^2]$ and w represents the beamforming vector whose entries indicate the complex weights applied to each transmit antenna 110. In order to preserve the overall signal power, the beamforming weights should satisfy the requirement $\|w\|=1$.

The base station 105 determines the beamforming vector weights using a gradient-projection technique. In one embodiment, the base station 105 determines the gradient of each signal-to-noise-plus-interference ratio (SINR) associated with each of the mobile units 115. For example, the base station 105 can determine the individual SINR values using the covariance matrix $\Theta_k$:

$$\Theta_k = E[H_k^+ \Sigma_k^{-1} H_k]$$

where $\Sigma_k$ is the covariance vector of the noise vector associated with the mobile unit 115(k) and the expectation value E[ ] is defined over the fading within $H_k$. In the illustrated case, the channel statistics are not a function of frequency and so the beamforming weights are also independent of frequency. The gradient of each SINR is then given by the formula:

$$\nabla_w \overline{SINR}_k(w) = \Theta_k w.$$

The covariance matrix holds approximately constant over the bandwidth of typical wireless communication systems 100 and over time spans that are typically short with respect to the coherence time of a shadow fading processes. For example, the coherence time of typical shadow fading processes is between hundreds of milliseconds and several seconds, depending on the speed of the mobile unit 115. Consequently, the covariance matrix may be determined by averaging the multicast fading over frequency and/or time, which typically results in a very reliable estimation of the covariance matrix at the receiving entity.

The channel information and/or the covariance of the noise vector may be determined using forward link and/or reverse link information. In one embodiment, each mobile unit 115 provides channel information indicative of the forward link to the base station 105, which may use this information to determine the covariance matrix using known relationships between the channel information and the quantities used to determine the covariance matrix. Alternatively, the base station 105 may estimate the covariance matrix based upon measurements of reverse link transmissions from the mobile units 115. The base station 105 can estimate the covariance matrix using reverse link transmissions because the statistical values of the channel matrix $H_k$, which are used to determine the covariance matrix, are reciprocal, unlike the instantaneous values of the channel matrix $H_k$. However, the covariance vector of the noise is not reciprocal and so when only reverse link information is available the base station 105 estimates the covariates matrix as:

$$\Theta_k \approx E[H_k^+ H_k].$$

Estimating the covariance matrix using only reverse link information may or may not result in a noticeable performance degradation depending on how much the noise covariance matrix departs from an identical matrix.

Figure 2:
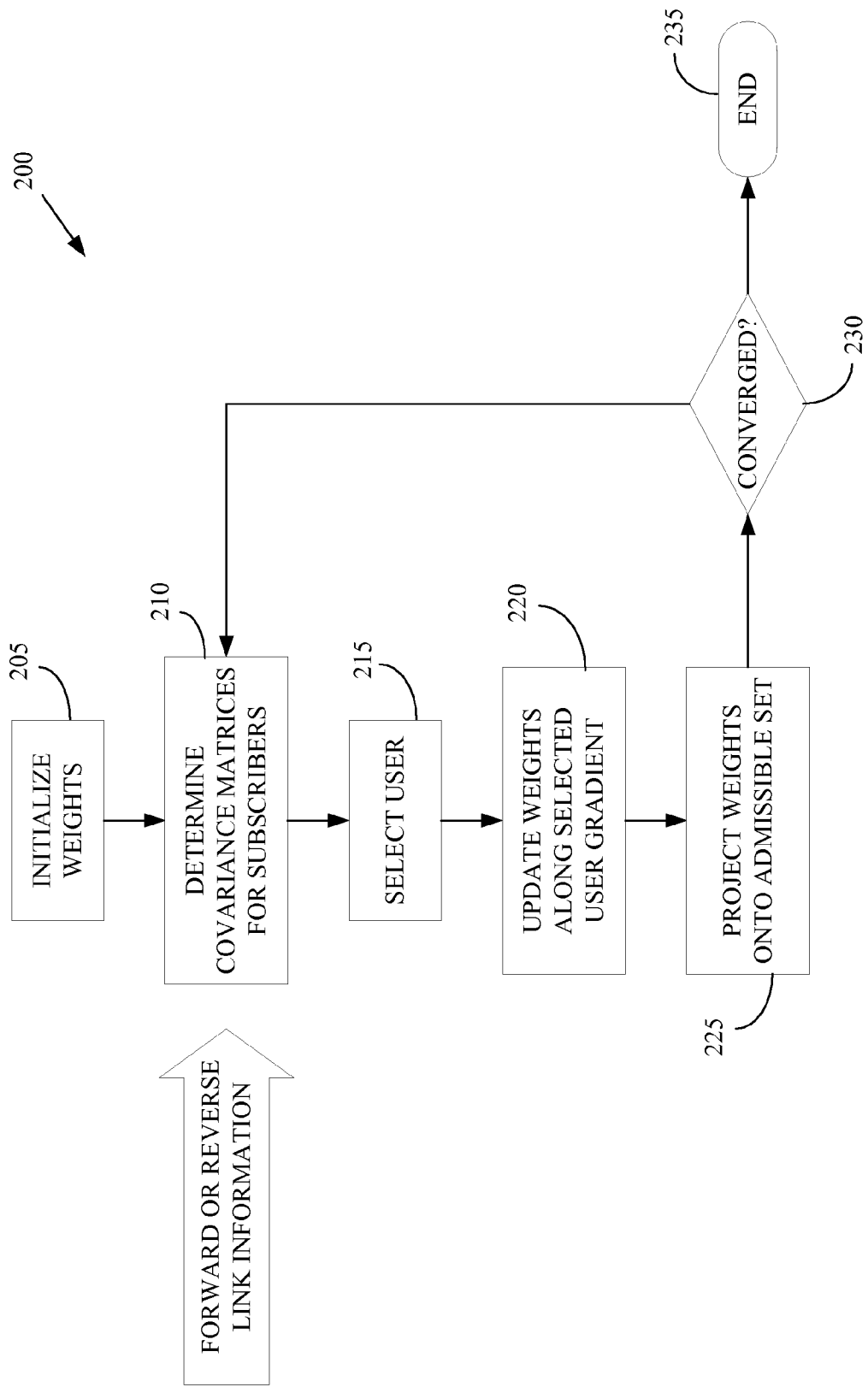
FIG. 2 conceptually illustrates one exemplary embodiment of a method of determining beamforming weights for multicast transmission, in accordance with the present invention While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

FIG. 2 conceptually illustrates one exemplary embodiment of a method 200 of determining beamforming weights for multicast transmission. The method 200 may be implemented in the base station 105 shown in FIG. 1 using hardware, firmware, software, or any combination thereof. In the illustrated embodiment, the beamforming weights are initialized (at 205). For example, the beamforming weights for each antenna can be initialized (at 205) to the same value and normalized to satisfy the requirement $\|w\|=1$. However, persons of ordinary skill in the art having benefit of the present disclosure should appreciate that a variety of different schemes or techniques for initializing (at 205) the beamforming weights may be used in alternative embodiments of the method 200.

The covariance matrices for each of the subscribers may then be determined (at 210). In the illustrated embodiment, the covariance matrices are determined (at 210) using forward and/or reverse link information that may be acquired by the base station and/or the subscribing mobile units. The covariance matrix may then be used to determine the SINR values associated with each subscriber and one of the subscribers may be selected (at 215) by comparing the determined SINR values to a threshold value of the SINR. In one embodiment, a threshold value of the SINR is set to a value such that subscribers associated with a lower SINR values are deemed out of coverage. The subscriber having the lowest value of the SINR that is also above the threshold value of the SINR may then be selected (at 215). The gradient of the selected user's SINR is then determined using the covariance matrix associated with the selected subscriber and the values of the beamforming weights are updated (at 220) along the direction of the gradient of the selected user. For example, the beamforming weights may be updated (at 220) according to the formula:

$$w^{(i+1)} = w^{(i)} + \mu \Theta w^{(i)}$$

where $\mu$ is a stepsize that may be selected and/or preconfigured while $\Theta$ is the covariance of the user selected (at 215). The superscripts (i) are used to denote the value of w at the i-th iteration of the method 200.

The updated beamforming weights are then projected (at 225) onto the admissible set using the requirement $\|w\|=1$. For example, the beamforming weights may be normalized (at 225) according to the formula:

$$w^{(i+1)} = \frac{w^{(i+1)}}{\|w^{(i+1)}\|}.$$

The updated beamforming weights may then be tested (at 230) to determine whether the beamforming weights have converged to a solution. The particular convergence criterion is a matter of design choice and not material to the invention. One exemplary convergence criterion indicates that the beamforming weights converge when a measure of the variation of the beamforming weights from one iteration to the next falls below a selected threshold level. If the updated beamforming weights have not converged (at 230), then the values of the covariance matrices may be determined (at 210) and used to update the values of the beamforming weights. The method 200 may end (at 235) if the updated beamforming weights have converged (at 230).

Embodiments of the techniques for determining beamforming rates for multicast transmission described herein have a number of advantages over conventional practice. In particular, the techniques described herein reduce the problem of determining the beamforming rates to a non-NP-hard problem that can be solved using an iterative approach. The iterative approach rapidly converges to a solution and the solutions generated by the iterative technique described herein have been shown to be nearly optimal.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method of determining a plurality of beamforming weights for application to multicast transmission to a plurality of users by a corresponding plurality of antennas associated with a base station, comprising:

determining a covariance matrix associated with the plurality of users, said covariance matrix being a function of a channel matrix and a noise-plus-interference vector associated with at least a portion of the plurality of users;

determining the plurality of beamforming weights based on a gradient of the covariance matrix associated with a selected one of the plurality of users, wherein determining the plurality of beamforming weights comprises selecting one of the plurality of users that has the lowest signal-to-interference-plus-noise ratio above a selected threshold value of the signal-to-interference-plus-noise ratio; and transmitting at least one multicast signal from the plurality of antennas using the determined beamforming weights associated with the plurality of antennas.

2. The method of claim 1, wherein determining the covariance matrix comprises determining the covariance matrix based on at least one of a feedback report provided by at least one user or at least one reverse link estimate performed by the base station.

3. The method of claim 1, comprising selecting the threshold value of the signal-to-interference-plus-noise ratio based upon a percentage of users deemed out of coverage.

4. The method of claim 1, wherein determining the plurality of beamforming weights comprises updating a previous estimate of the plurality of beamforming weights using the gradient of the covariance matrix associated with the selected one of the plurality of users and a selected stepsize.

5. The method of claim 4, comprising projecting the determined plurality of beamforming weights onto an admissible set of beamforming weights.

6. The method of claim 1, wherein determining the plurality of beamforming weights comprises determining an initial estimate of the plurality of beamforming weights and iteratively updating the initial estimate of the plurality of beamforming weights based on the gradient of the covariance matrix.

7. The method of claim 6, comprising selecting, during each iteration, one of the plurality of users and determining the gradient of the covariance matrix associated with the user selected for the current iteration.

8. A method of determining a plurality of beamforming weights for application to multicast transmission to a plurality of users by a corresponding plurality of antennas associated with a base station, comprising:

determining a covariance matrix associated with the plurality of users, said covariance matrix being a function of a channel matrix and a noise-plus-interference vector associated with at least a portion of the plurality of users;

determining the plurality of beamforming weights based on a gradient of the covariance matrix associated with a selected one of the plurality of users, wherein determining the plurality of beamforming weights comprises updating a previous estimate of the plurality of beamforming weights using the gradient of the covariance matrix associated with the selected one of the plurality of users and a selected stepsize; and transmitting at least one multicast signal from the plurality of antennas using the determined beamforming weights associated with the plurality of antennas.

9. The method of claim 8, comprising projecting the determined plurality of beamforming weights onto an admissible set of beamforming weights.

10. A method of determining a plurality of beamforming weights for application to multicast transmission to a plurality of users by a corresponding plurality of antennas associated with a base station, comprising:

determining a covariance matrix associated with the plurality of users, said covariance matrix being a function of a channel matrix and a noise-plus-interference vector associated with at least a portion of the plurality of users;

determining the plurality of beamforming weights based on a gradient of the covariance matrix associated with a selected one of the plurality of users, wherein determining the plurality of beamforming weights comprises determining an initial estimate of the plurality of beamforming weights and iteratively updating the initial estimate of the plurality of beamforming weights based on the gradient of the covariance matrix; and transmitting at least one multicast signal from the plurality of antennas using the determined beamforming weights associated with the plurality of antennas.

11. The method of claim 10, comprising selecting, during each iteration, one of the plurality of users and determining the gradient of the covariance matrix associated with the user selected for the current iteration.

12. The method of claim 10, wherein determining the plurality of beamforming weights comprises determining an initial estimate of the plurality of beamforming weights and iteratively updating the initial estimate of the plurality of beamforming weights based on the gradient of the covariance matrix.

13. The method of claim 12, comprising selecting, during each iteration, one of the plurality of users and determining the gradient of the covariance matrix associated with the user selected for the current iteration.

* * * * *